H. P. ALLEN.
ATTACHMENT FOR SPOONS.
APPLICATION FILED APR. 17, 1915.
1,186,363.
Patented June 6, 1916.
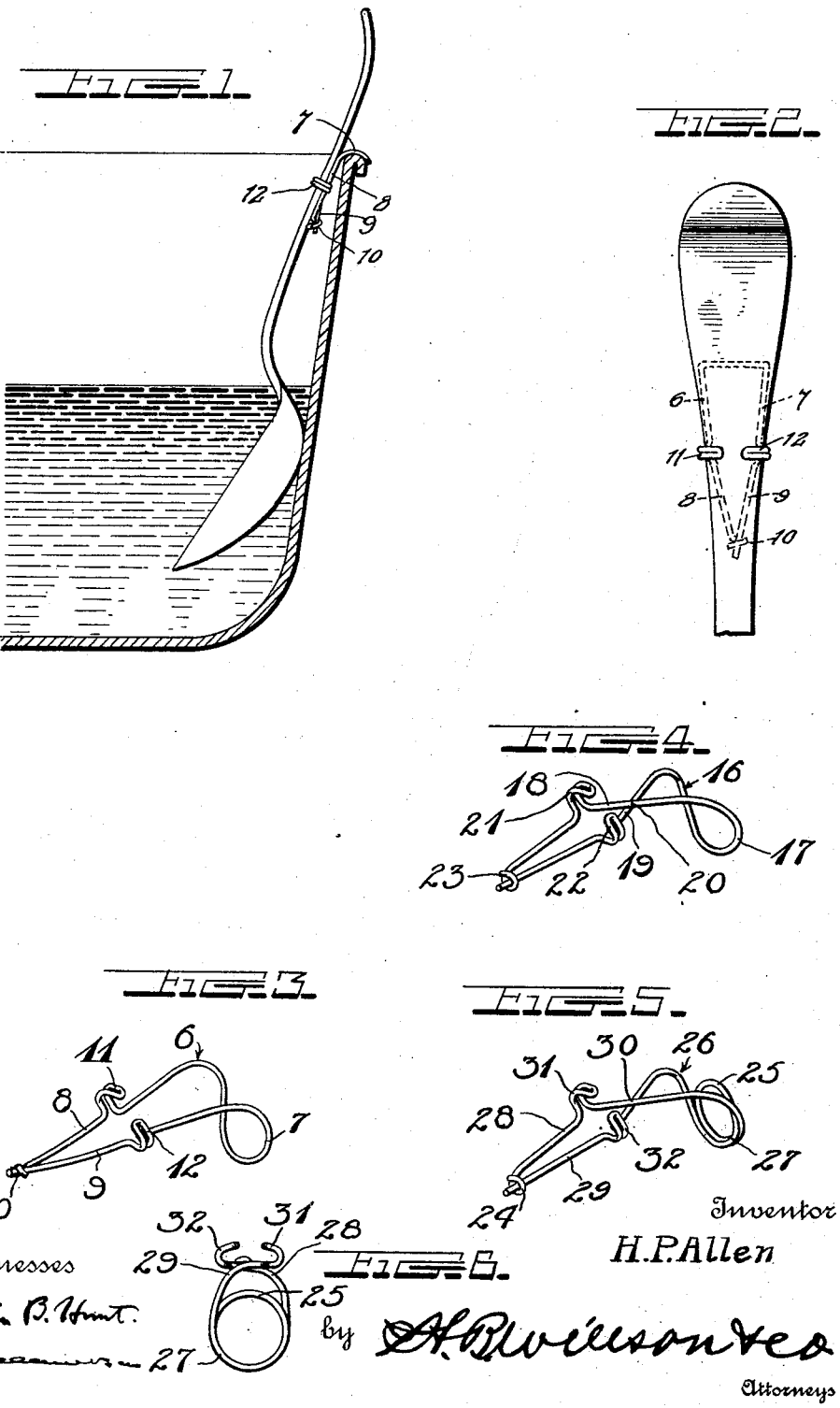
Witnesses
Edwin B. Hunt
Inventor
H. P. Allen
by H. P. Willson & Co.
Attorneys

UNITED STATES PATENT OFFICE.

HARRY P. ALLEN, OF AUSTIN, TEXAS, ASSIGNOR OF ONE-HALF TO JOHN R. DONNELLY, OF AUSTIN, TEXAS.

ATTACHMENT FOR SPOONS.

1,186,363.  Specification of Letters Patent. Patented June 6, 1916.

Application filed April 17, 1915. Serial No. 22,035.

*To all whom it may concern:*

Be it known that I, HARRY P. ALLEN, a citizen of the United States, residing at Austin, in the county of Travis and State of Texas, have invented certain new and useful Improvements in Attachments for Spoons; and I do declare the following to be a full, clear, and exact description of the invention, such as will enable others skilled in the art to which it appertains to make and use the same.

This invention relates to improvements in attachments for spoon or fork handles.

The object of the invention is to provide a simply constructed and efficient attachment adapted to support the article to which it is applied upon the edge of a vessel and prevent it from slipping into the vessel.

Another object is to provide a device of this character which may be quickly applied and removed and which is constructed to reliably engage the spoon handle to hold it against accidental detachment on such handle.

With these and other objects in view, the invention consists of certain novel features of construction, and the combination and arrangement of parts as will be hereinafter more fully described and claimed.

In the accompanying drawings: Figure 1 represents a vertical section of a portion of a receptacle showing a spoon supported by the side thereof and illustrating the application of one form of this improved attachment and the method of supporting the spoon thereby; Fig. 2 is a front elevation of the upper end of a spoon handle showing this improved attachment mounted thereon; Fig. 3 represents a perspective view of one form of the invention; Fig. 4 is a similar view showing another form of the invention; Fig. 5 is a similar view of still another form of the invention, and Fig. 6 is an end elevation of the form shown in Fig. 5.

In the form shown in Figs. 1 to 3, the attachment comprises a spring metal wire bent intermediately of its ends to form a loop 6, the closed end of which is bent laterally to form a hook 7 which is designed to hook over the edge of a kettle or other vessel when applied to the spoon to hold it against slipping down into the kettle. The arms 8 and 9 of this loop converge toward their free ends and are connected by twisting one end around the other as shown at 10 and with the terminal of the twisted end brought back into engagement with the arm which carries the twisted end, whereby a very simple yet reliable connection is formed for holding the ends against separation. These arms 8 and 9 are bowed outwardly and are provided intermediately of their ends with inturned hooks 11 and 12 which are formed by producing laterally extending loops in said arms with their side members in contact and then bending the closed ends of said loops inwardly and spacing them from the shanks thereof to produce the hooks 11 and 12 which are designed to engage opposite side edges of the spoon handle to which the attachment is connected. These hooks 11 and 12 being formed of the loops having their side members contacting are rendered substantially rigid to form strong gripping elements and being formed on the converging arms 8 and 9 have a wedge-like engagement with the side edges of the spoon handle when applied so that the more pressure that is exerted on the hook 7 of the attachment which is engaged with the kettle edge, the tighter the attachment will be bound to the spoon.

In the form shown in Fig. 4, the attachment is also constructed of a spring wire bent intermediately of its ends to form a loop 16 and with the closed end of said loop bent laterally and outwardly to form a hook 17 which is designed to hook over the edge of a vessel when applied to a spoon in a manner well understood. The arms or side members 18 and 19 of the loop 6 cross each other intermediately of their ends as shown at 20, said crossed portions occurring at the inner end of the hook 17 and permitting the side members or arms 18 and 19 to be adjusted laterally toward and away from each other for a purpose to be described. These arms are provided intermediately of their ends preferably adjacent the crossed connection thereof with inturned hooks 21 and 22 which are formed in a manner similar to the hooks 11 and 12 above described and are designed to engage the opposite side edges of a spoon handle when applied. These arms 18 and 19 converge toward their free ends and are here shown connected similarly to those shown in Fig. 3 except that a single twist 23 is formed on the arm 18 instead of several as shown in Fig. 3. From the above description it will be obvious that the arms 18 and 19, owing to their resiliency and their being crossed at 20, may be adjusted laterally toward and away from each other to bring the hooks 21 and 22 closer to or farther apart and thus adapt the attachment for use on spoon handles of varying widths.

In the form shown in Figs. 5 and 6, the attachment is also constructed of resilient wire which is bent intermediately of its ends to form a loop 26, the closed end of which is constructed in the form of a coil 25 and this loop is bent laterally and outwardly to form a hook 27 for engagement with the edge of a vessel when the device is applied to a spoon or other implement. The arms 28 and 29 of the loop 26 cross each other at the base of the hook 27 as shown at 30 and converge toward their free ends, which are connected to the same as in Fig. 4 with a single twist 24 formed at the end of the arm 28 which engages the terminal of the arm 29. These arms 28 and 29 are provided with laterally extending inturned hooks 31 and 32 similar to the hooks 21 and 22 shown in Fig. 4 and which are designed to operate in the same manner, being adapted to engage the opposite side edges of the spoon handle to which the device is applied, the crossing of the arms 28 and 29 and the formation of the coil 25 in the loop providing amply for the lateral adjustment of said hooks toward and away from each other to adapt the attachment to fit articles of varying widths.

From the above description, it will be obvious that any one of the attachments described may be employed in connection with any desired number of spoons or other articles, being quickly removable from one and readily applicable to another.

I claim as my invention:

A supporting attachment for spoons and the like comprising a piece of wire bent intermediately of its ends to form a loop, the closed end of which is bent laterally and outwardly to form an article engaging hook, said arms intermediately of their ends being bent to form laterally extending loops with their side members in contact, the closed ends of said loops being bent inwardly to form inturned hooks disposed on the face of the attachment opposite to that on which the end hook is disposed, whereby substantially rigid gripping elements are provided for engaging the opposed side edges of a spoon handle, said arms converging toward their free ends, whereby the side hooks are designed to have a wedge-like engagement with the side edges of the spoon handle to which the attachment is applied, and the free end of one of said arms being twisted around the other and the terminal of said twisted end brought back into engagement with the arm carrying it, whereby the ends are reliably connected against separation.

In testimony whereof I have hereunto set my hand in presence of two subscribing witnesses.

HARRY P. ALLEN.

Witnesses:
Wm. H. Stacy,
L. A. Robbins.